United States Patent Office 2,761,878
Patented Sept. 4, 1956

2,761,878
β IONYLIDENE ACETALDEHYDE AND METHOD OF PRODUCING THE SAME

Henderikus Obias Huisman, Weesp, Netherlands, assignor to Hartford National Bank and Trust Company, Hartford, Conn., as trustee No Drawing. Application June 20, 1950,
Serial No. 169,286

12 Claims. (Cl. 260—598)

This invention relates to a method of preparing products having a vitamin A activity and to intermediate products employed in the synthesis of vitamin A or compounds with vitamin A activity.

It is well-known that β-ionylidene-acetic aldehyde

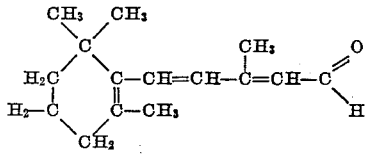

is an important starting material in the synthesis of vitamin A

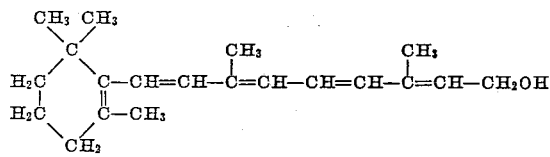

and other compounds exhibiting vitamin A activity. The preparation of β-ionylidene-acetic aldehyde has been described in the literature by various methods (cf. the method described by Kuhn and Morris; see also Arens and van Dorp, Recueil des Travaux Chimiques des Pays-Bas 67, 973 (1948)).

The method of Kuhn and Morris has the drawback that it is, to a large extent, non-reproducible while the method of Arens and van Dorp requires a large number of steps. Furthermore, the respective described methods fail to positively indicate the production of analytically pure β-ionylidene-acetic aldehyde.

Several other methods of producing β-ionylidene aldehyde have been described in the literature (see Heilbron cs. J. Chem. Soc. 1935, 584; Wittig and Hartman; Ber. 72 B, 1391 (1939); Krauze and Slobodian: J. Gen. Chem. U. S. R. 10, 907 (1940); Chem. Abstracts 35, 3237 (1941); Karrer and Rügger: Helv. Chim. Acta 28, 319 (1945); Croshnek: J. Am. Chem. Soc. 67, 721 (1945); Shunts, J. Am. Chem. Soc. 68, 2553 (1946); and Nilas cs. Vitamins and Hormones 5, 2 (1947)). These methods each have drawbacks and do not lead to analytically pure β-ionylidene aldehyde.

It is an object of this invention to provide a method of producing analytically pure β-ionylidene-aldehyde in a simple manner which is adapted to industrial operations.

According to the invention β-ionylidene acetonitrile is reduced with lithium-aluminium hydride, and the resulting reaction product is then hydrolyzed to yield β-ionylidene aldehyde.

The β-ionylidene acetonitrile

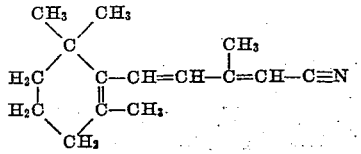

may be produced with a satisfactory output from β-ionone, for example, with the cyanic acetic acid methylester, in the presence of ammonium acetate and acetic amide in boiling acetic acid, followed by saponification of the 2-cyanic-β-ionylidene-acetic acid methylester with caustic lye and heating of the acid thus obtained with copper powder (see Wittig and Hartmann, Ber. 72 B, 1387 (1939)).

It appears that lithium aluminium hydride is capable of reducing various groups, such as carbonyl groups and acyl groups while, as a rule, carbon double bonds are left unattacked. Under certain conditions, i. e. if an excess of the lithium aluminium hydride is used, double bonds will be unattacked resulting in the production of primary amines from nitriles. Accordingly, it is essential that the reducing agent, i. e. lithium aluminium hydride, be added to the β-ionylidene acetonitrile in specified quantities and that the reaction be carried out at low temperatures, preferably between −50° C. and 0° C. Best results have been obtained with a ratio of about 2 mols. of β-ionylidene acetonitrile to 1 mol. of lithium aluminium hydride.

As solvents for the nitrile, it has been found preferable to employ cyclohexane, triethylamine and petroleum ether.

The β-ionylidene-acetic aldehyde obtained according to the invention is separated in the form of a crystalline semi-carbazone, which melts at normal pressure at 192° to 193° C. (corrected) and in high vacuum at 196.5° to 197.5° C. (corrected). The semi-carbazone crystallizes in slender colourless needles, which, if exposed to light and air, very rapidly become yellow in colour. The ultra-violet absorption spectrum in ethanol has a continuous variation with a sharp maximum at 3200 A.

$$(E^{1\%}_{1\,cm.} = 1302;\ \epsilon = 35,800 \text{ in ethanol})$$

where $$E^{1\%}_{1\,cm.}$$

designates the negative logarithm of the passage of a solution of 1% of the substance in a trough 1 cm. in height; $\epsilon$ designates the molar extinction and is calculated from the following relation:

$$\epsilon = \frac{M}{10} \times E^{1\%}_{1\,cm.}$$

where M designates the molecular weight of the substance. The analysis of the semi-carbazone corresponds to an empirical formula $C_{16}H_{25}ON_3$.

Further in accordance with the invention, it is possible to separate the aldehyde as a bisulfite compound by subjecting an etheric solution of the raw reaction product with a sulfur dioxide solution of sodium bisulfite (pH 4). The β-ionylidene aldehyde may be separated from the bisulfite compound, which is soluble in water, with diluted lye, soda, or bicarbonate. The aldehyde thus produced is an organic, liquid oil. After one absorption on "weak" alumina (alumina suspended in water to which is added acetic acid while stirring until the liquid has a pH of 5, followed by filtering and washing the alumina with water, heating the alumina at about 100° C. and exposing to air in the form of a thin layer for two hours at room temperature) and eluation with petroleum ether (boiling range from 40° C. to 60° C.), the aldehyde is obtained as a light citron yellow oil in an analytically pure state. The aldehyde has a boiling point of from 104° C. to 106° C. at 0.015 mm., without decomposition. The aldehyde has the following indicated properties:

Index of refraction $N_D 25° = 1.5762$.

The analysis of the aldehyde corresponds with the empirical formula $C_{15}H_{22}O$ Found: C, 82.24; H, 10.37.
82.43; 10.33.

Calculated for $C_{15}H_{22}O$ (mol. wt. 218.33); C, 82.52; H, 10.16.

The ultra-violet absorption spectrum of the β-ionylidene-acetic aldehyde in cyclohexane has a continuous variation with two maxima and one minima:

Max. 2670 A; $E_{1\ cm.}^{1\%} = 560$; $\epsilon = 12,200$

Max. 3100 A; $E_{1\ cm.}^{1\%} = 670$; $\epsilon = 14,600$

Min. 2330 A; $E_{1\ cm.}^{1\%} = 235$; $\epsilon = 5,130$

β-ionylidene-acetic aldehyde exhibits a red-brown colour with a solution of antimonytrichloride in chloroform (Carr and Price reagent). The solution exhibits a sharp maximum at about 5000 A ($E_{1\ cm.}^{1\%} = 2495$; $\epsilon = 54.400$)

after two minutes in a spectrophotometer. Analysis of the phenyl-semi-carbazone, hitherto unknown in the literature, of the β-ionylidene-acetic aldehyde, which yields colourless needles and melts at 174° C. or 175° C. (corrected), corresponds to the empirical formula: $C_{22}H_{29}ON_3$.

The ultra-violet absorption spectrum of the phenyl-semi-carbazone in ethanol has a continuous variation at two maxima:

Max. 2400 A; $E_{1\ cm.}^{1\%} = 440$; $\epsilon = 14,000$

Max. 3280 A; $E_{1\ cm.}^{1\%} = 1260$; $\epsilon = 40,700$

The β-ionylidene-acetic aldehyde in an analytically pure state may be regenerated from the pure semi-carbazone by heating with a solution of pyroracemic acid in diluted acetic acid, followed by pouring the raw reaction product into water, extracting with petroleum ether (boiling range 40° C. to 60° C.) and subsequent chromatographic absorption on weak alumina.

The aldehyde thus regenerated is identical in every respect with the β-ionylidene-acetic aldehyde described above.

The β-ionylidene-acetic aldehyde can readily be converted to compounds with vitamin A activity without difficulty (see Kuhn and Morris, Ber. 70, 857–858, (1937) and Arens and van Dorp, Rec. Trav. Chim. Pays-Bas 67, 976 (1948)). Vitamin-A esters can be produced by condensation of β-ionylidene-acetic aldehyde with methyl 3-bromine-4-crotone acid esters in the presence of active zinc (method of Reformatsky). The so-called "$C_{18}$ ketone"

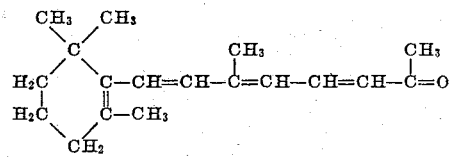

can be prepared by condensation of β-ionylidene-acetic aldehyde with acetone.

The method according to the invention for producing β-ionylidene-acetic aldehyde is preferably carried out in a moisture-free oxygen-free gaseous atmosphere.

The invention will be described with reference to the following examples:

*Example 1*

In a three-neck jar comprising a cooler, a dripping funnel and gas-supply tube, 4.3 gms. of (0.02 mol.) β-ionylidene-acetonitrile are dissolved in 30 ccs. of dry ether. Subsequently, the jar is placed in a cooling mixture of —50° C. With the exclusion of moisture and the introduction of nitrogen, 10.7 ccs. (0.005 mol.) of a 0.47 molar etheric solution of LiAlH₄ is dripped in for 5 minutes. When the entire quantity has been added, the solution has a brown-red colour. The temperature of the reaction mixture is allowed to rise gradually to room temperature within about 4 hours, the solution then becoming darker in colour. Then, the mixture is poured, in an atmosphere of nitrogen, into about 60 ccs. of icy 2 N-sulphuric acid, contained in a separation funnel. During the decomposition hydrogen is evolved.

The orange-red ether layer is separated and the light yellow acid layer is ethered out three times with 20 ccs. of ether each time. These ether extracts are added to the initial ether layer, after which washing is performed four times with 20 ccs. of water each time. After drying on sodium sulphate, the ether is evaporated in vacuo, the residue being 4.2 gms. of orange-red oil. This oil is dissolved in 100 ccs. of alcohol to which 50 ccs. of a sodium bisulphite solution containing sulphur dioxide is added (this solution contains 100 gms. of sodium bisulphite and 75 ccs. of icy acetic acid a liter and has a pH of 4).

Then boiling takes place in a flow-back cooler for 2 to 3 hours in an atmosphere of nitrogen. The alcohol is then distilled out to a maximum in vacuo and the cooled residue is poured through a separation funnel into about 300 ccs. of water. The "non-bisulphite fraction" is removed by extracting 4 times with 50 ccs. of ether each time. The clear colourless water layer has dripped into it while passing nitrogen through it a 1 N-solution of sodium hydroxide until the solution yields an alkaline reaction with respect to litmus, the β-ionylidene-acetic aldehyde separating out as a finely-divided, colourless oil which is removed from the water layer after extracting four times with ether. The last extraction is accompanied by saturation of the water layer with sodium chloride.

Subsequent to drying on sodium sulphate and evaporation of the solvent in vacuo 0.5 gm. of β-ionylidene-acetic aldehyde is obtained as an orange-coloured comparatively liquid oil. This means an output of 11.6%, calculated for β-ionylidene acetonitrile. By chromatographic absorption on weak alumina and eluation with petroleum ether (boiling range from 40° to 60° C.) it may be obtained in the analytically pure state as a light-yellow oil.

Subsequent to washing with water, drying on sodium sulphate, and evaporation of the ether in vacuo, the etheric solution of the "non-bisulphite fraction" yields 3.473 gms. of orange-red oil, from which, subsequent to chromatographic adsorption on weak alumina and eluation with petroleum ether, 1.408 gms. (i. e. 33%) of unchanged β-ionylidene-acetonitrile is regenerated.

*Example 2*

Under the same conditions as described in Example 1, 4.3 gm. (0.02 mol.) of the nitrile is dissolved in 30 ccs. of dry ether and cooled in a cooling mixture to —50° C.

Within 10 minutes, at this temperature, 42.8 ccs. (0.02 mol.) of a 0.47-molar LiAlH₄ solution is dripped in, the mixture assuming a brown-red colour. Within 1.25 hours, the temperature is gradually raised to —5° C., the solution gradually assuming a darker colour. After pouring out into 60 ccs. of ice-cold 2-N sulphuric acid, during which operation a large volume of hydrogen is evolved, the orange-red ether layer is separated out and the weakly yellow acid layer is ethered out three times with 20 ccs. of ether each time.

These ether extractions are added to the initial ether layer, which is subsequently washed four times with 20 ccs. of water each time. After the first and the second times, an orange-red oil is separated out from the ether layer which oil is collected separately. After the third and fourth times an intermediate layer is no longer produced. This oil has basic properties and is probably a sulphate which is soluble in water and which, after being washed with water, is evidently no longer soluble in this ether layer. Upon cooling, this oil crystallizes slowly and forms light-yellow flakes. This fraction is designated the "basic fraction." After removing this "basic fraction," the initial ether layer has assumed a lighter colour (orange-yellow). After drying on sodium sulphate and evaporation of the ether, the residue is 1.415 gms. (i. e. 33%) of orange-red, comparatively viscous oil. As described in Example 1, this oil is boiled with a sodium-bisulphite solution containing sulphuric dioxide. After distilling out the alcohol in vacuo the residue is poured out into 300 ccs. of water, whereupon the "non-bisulphite fraction" is removed by extraction with ether.

The β-ionylidene-acetic aldehyde is isolated from the clear, colourless water layer, in the manner described in Example 1.

0.3 gm. of orange-yellow oil, i. e. an output of 7% is obtained. The "non-bisulphite fraction" was not examined further.

The "basic fraction" (see above) was suspended in ether and shaken with 2-N sodium hydroxide, the substance dissolving completely in the ether layer with an orange-red colour. Subsequent to washing with water, drying on sodium sulphate and evaporation of the solvent in vacuo, the residue was 2.365 gms. (i. e. 55%) of orange-red liquid oil, which reacted as a base on litmus.

*Example 3*

Under the same conditions as described in Examples 1 and 2, 4.3 gms. of the nitrile (0.02 mol.) are dissolved in 30 ccs. of ether and cooled to −50° C. Within about 10 minutes 21.4 ccs. (0.01 mol.) of a 0.47 molar etheric LiAlH₄-solution is added dropwise to this solution, which assumes a brown-red colour. Within about three quarters of an hour the temperature is allowed to rise to −15° C., after which the reaction mixture is kept at a temperature between −10° and 15° C. for about 1 hour. Then the mixture is poured into 60 ccs. of ice-cold 2-N sulphuric acid and used up as described in Example 2. During hydrolysis a large volume of hydrogen is evolved. Subsequent to washing the orange-red ether layer with water, an oil is again separated out, the "basic fraction," which is used up in the manner described in Example 2. 0.5 gm. (i. e. 12%) of "basic fraction" is obtained.

Subsequent to drying the orange-coloured ether layer on sodium sulphate and evaporation of the ether, the residue was 3.5 gms. of orange-red, comparatively liquid oil, from which, subsequent to treatment with a sodium bisulphite solution containing sulphuric dioxide as described in Example 1, 1.465 gms. of orange-yellow β-ionylidene-acetic aldehyde was isolated. This means an output of about 34%.

From the "non-bisulphite fraction," 1.5 gms., 0.323 gm. (i. e. 7.5%) of unchanged β-ionylidene-acetonitrile was regenerated in the manner described in Example 1. The output of β-ionylidene-acetic aldehyde, calculated from the converted nitrile, thus was about 37%.

*Example 4*

Under the same conditions as described in Example 1, 4.3 gms. of the nitrile (0.02 mol.) are dissolved in 30 ccs. of dry cyclohexane and cooled to −30° C.

21.4 ccs. (0.01 mol.) of a 0.47 molar etheric LiAlH₄-solution are added dropwise to this solution within about 10 minutes, the solution assuming a brown-red colour. Within about two and one-half hours the mixture is allowed to gradually assume room temperature. Then it is poured into 60 ccs. of ice-cold 2-N sulphuric acid and used up in the manner described in Example 2. A large volume of hydrogen is evolved during hydrolysis. Subsequent to washing the orange-red ethericcyclohexane layer with water, an oil, the "basic fraction," is separated out; this is used up in the manner described in Example 2. 20% of the "basic fraction" is obtained.

Subsequent to drying the orange etheric cyclehexane layer on sodium sulphate and evaporation of the solvent, the residue is 3.335 gms. of orange-red, oil, from which, after treatment with a sodium bisulphite solution containing sulphur dioxide in the manner described in Example 1. 0.535 gm. of orange-yellow β-ionylidene-acetic aldehyde is obtained. This means an output of 12.5%.

*Example 5*

Under the same conditions as described in Example 1, 4.3 gms. of the nitrile (0.02 mol.) are dissolved in 30 ccs. of dry thiethylamine and cooled to −40° C.

21.4 ccs. of (0.01 mol.) of a 0.47 molar etheric LiAlH₄-solution are added dropwise to this solution and within 10 minutes the solution assumes a brown-red colour. Within about two and one-half hours the mixture is allowed gradually to assume room temperature. Subsequently the mixture is poured, while cooling into 300 ccs. of 2-N sulphuric acid and used up in the manner described in Example 2. A large volume of hydrogen is evolved during hydrolysis. Subsequent to washing the orange-red ether layer with water, an oil, the "basic fraction," is separated out and used up in the manner described in Example 2. 21% of "basic fraction" is obtained.

Subsequent to drying the orange ether layer on sodium sulphate and evaporation of the solvent, the residue is 3.081 gms. of orange-red oil, from which, subsequent to treatment with a sodium-bisulphite solution containing sulphur dioxide in the manner described in Example 1, 1.259 gms. of orange-yellow β-ionylidene-acetic aldehyde are obtained. This means an output of about 29%.

*Example 6*

Under the same conditions as described in Example 1, 4.3 gms. of the nitrile (0.02 mol.) are dissolved in 30 ccs. of dry petroleum ether (boiling range from 40° to 69° C.) and cooled to −40° C. Within about 10 minutes 21.4 ccs. of (0.01 mol.) of a 0.47 molar etheric LiAlH₄-solution is added dropwise to this solution which assumes a brown-red colour. Within about two and one-half hours the temperature is allowed to rise gradually to room temperature. Subsequently, the mixture is poured into 60 ccs. of ice-cold 2-N sulphuric acid and used up in the manner described in Example 2. A large volume of hydrogen is evolved during hydrolysis. Subsequent to washing of the orange-red ether-petroleum-ether layer with water, an oil, the "basic fraction," is separated out and used up in the manner described in Example 2.

Subsequent to drying the orange ether-petroleum-ether layer on sodium sulphate and evaporation of the solvent, the residue is 2.914 gms. of orange-red, comparatively liquid oil, from which, subsequent to treatment with a bisulphite solution containing sulphur dioxide in the manner described in Example 1, 0.894 gm. of orange-yellow β-ionylidene-acetic aldehyde is separated. This means an output of 21%.

While the invention has thus been described with specific examples and applications thereof, other obvious modifications will appear obvious to those skilled in the art without departing from the spirit and scope of the invention as defined in the appended claims.

What I claim is:

1. A method of preparing a compound having vitamin A activity comprising the steps of subjecting β-ionylidene-acetonitrile to the action of lithium aluminiumhydride to reduce the said nitrile, and hydrolizing the reaction product thus obtained to convert the reduced nitrile to β-ionylidene-acetic aldehyde.

2. A method of preparing a compound having vitamin A activity comprising the steps of reacting β-ionylidene-acetonitrile with lithium aluminiumhydride in a molecular ratio of about 2:1 to reduce the said nitrile without attacking double bonds therein, and hydrolyzing the reaction product thus obtained to convert the reduced nitrile to β-ionylidene-acetic aldehyde.

3. A method of preparing a compound having vitamin A activity comprising the steps of reacting β-ionylideneacetonitrile with lithium aluminium hydride at a temperature of about −50° C. to 0° C. to reduce the said nitrile without attacking double bonds therein, and hydrolyzing the resulting reaction product thus obtained to convert the reduced nitrile to β-ionylidene-acetic aldehyde.

4. A method of preparing a compound having vitamin A activity comprising the steps of reacting β-ionylidene-acetonitrile with lithium aluminium hydride in a molecular ratio of about 2:1 and at a temperature of about −50° C. to 0° C. to reduce the said nitrile without attack of double bonds therein, and hydrolyzing the resulting reaction product to convert the reduced nitrile to β-ionylidene-acetic aldehyde.

5. A method of preparing β-ionylidene-acetic aldehyde comprising reacting β-ionylidene-acetonitrile with lithium aluminium hydride to reduce the said nitrile, subjecting the resulting reaction product to a bisulfite solution to convert the reduced nitrile to the corresponding aldehyde-bisulfite compound, and separating β-ionylidene-acetic aldehyde from solution.

6. A method of preparing β-ionylidene-acetic aldehyde comprising reacting β-ionylidene-acetonitrile with lithium aluminium hydride in a molecular ratio of about 2:1 at a temperature of about −50° C. to 0° C. to reduce the said nitrile without attack of double bonds therein, subjecting the resulting reaction product to the action of a bisulfite compound in solution to convert the reduced nitrile to the corresponding bisulfite-aldehyde compound, and separating β-ionylidene-acetic aldehyde from solution with dilute lye.

7. A method for preparing β-ionylidene-acetic aldehyde comprising the steps of reacting β-ionylidene-acetonitrile in a solvent of diethylether with lithium anhydride in a molecular ratio of about 2:1 and at a temperature of about −50° C. to 0° C. to reduce the said nitrile without attack of double bonds therein, and hydrolyzing the resulting reaction product thus obtained to convert the reduced nitrile to β-ionylidene-acetic aldehyde.

8. A method for preparing β-ionylidene-acetic aldehyde comprising the steps of reacting β-ionylidene-acetonitrile in a solvent of triethylamine with lithiumaluminium hydride in a molecular ratio of about 2:1 and at a temperature of about −50° C. to 0° C. to reduce the said nitrile without attack of double bonds therein, and hydrolyzing the resulting reaction product to convert the reduced nitrile to β-ionylidene-acetic aldehyde.

9. A method for preparing β-ionylidene-acetic aldehyde comprising the steps of reacting β-ionlyidene-acetonitrile in a solution of cyclohexane with lithium aluminium hydride in a molecular ratio of about 2:1 and a temperature of about −50° C. to 0° C. to reduce the said nitrile without attack of double bonds therein, and hydrolyzing the resulting reaction product to convert the reduced nitrile to β-ionylidene-acetic aldehyde.

10. A method for preparing β-ionylidene-acetic aldehyde comprising the steps of reacting β-ionylidene-acetonitrile with lithium aluminium hydride in a molecular ratio of about 2:1 at a temperature of about −50° C. to 0° C. in a moisture- and oxygen-free gaseous atmosphere to reduce the said nitrile without attack of double bonds therein, and hydrolyzing the resulting reaction product to convert the reduced nitrile to β-ionylidene-acetic aldehyde.

11. A method for preparing β-ionylidene-acetic aldehyde comprising the steps of reacting β-ionylidene-acetonitrile with lithium aluminium hydride in a molecular ratio of about 2:1 at a temperature of about −50° C. to 0° C. in a moisture- and oxygen-free gaseous atmosphere to reduce the said nitrile without attack of double bonds therein, subjecting the resulting reaction product to a sulfur dioxide solution of sodium bisulfite to convert the reduced nitrile to a bisulfite aldehyde compound, and converting the latter to β-ionylidene-acetic aldehyde with dilute lye.

12. The method of making β-ionylidene acetaldehyde which comprises reacting β-ionylidene acetonitrile with lithium aluminum hydride under conditions effective to cause addition of said hydride to said nitrile in the ratio of one quarter mole of said metal hydride to one mole of said nitrile, and hydrolyzing the resulting reaction product to β-ionylidene acetaldehyde before substantial further addition occurs.

References Cited in the file of this patent
UNITED STATES PATENTS 2,507,647     Robeson et al. _____ May 23, 1950

OTHER REFERENCES

Heilbron: Jour. Chem. Soc. (British), 1948, pp. 386–393.